(12) United States Patent
Polisson et al.

(10) Patent No.: US 10,640,117 B2
(45) Date of Patent: May 5, 2020

(54) DRIVING CUES AND COACHING

(71) Applicant: Allstate Insurance Company, Northbrook, IL (US)

(72) Inventors: William Polisson, Vernon Hills, IL (US); Regina Madigan, Mountain View, CA (US); Timothy W. Gibson, Barrington, IL (US); Surender Kumar, Palatine, IL (US); Mark Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 262 days.

(21) Appl. No.: 15/239,291

(22) Filed: Aug. 17, 2016

(65) Prior Publication Data

US 2018/0050698 A1    Feb. 22, 2018

(51) Int. Cl.
*B60W 30/182* (2020.01)
*B60W 40/08* (2012.01)
(Continued)

(52) U.S. Cl.
CPC .......... *B60W 30/182* (2013.01); *B60W 40/09* (2013.01); *G05D 1/0061* (2013.01); *G06Q 10/04* (2013.01); *G06Q 30/0283* (2013.01); *G06Q 50/30* (2013.01); *B60W 2040/0809* (2013.01); *B60W 2050/0095* (2013.01); *B60W 2540/30* (2013.01); *B60W 2550/12* (2013.01); *G05D 2201/0213* (2013.01)

(58) Field of Classification Search
CPC .............. B60W 30/182; B60W 40/08; B60W 2040/0809; B60W 2550/12; B60W 2900/00; B60W 40/09; B60W 2050/0095; B60W 2540/30; G05D 1/0061; G05D 1/0088; G05D 2201/0213; G06Q 30/0283
See application file for complete search history.

(56) References Cited

U.S. PATENT DOCUMENTS 9,566,986 B1 *  2/2017  Gordon ................. B60W 50/12
9,786,178 B1 * 10/2017  Bai ........................ G08G 1/166
(Continued)

OTHER PUBLICATIONS

Oct. 25, 2017—(WO) International Search Report and Written Opinion—App. PCT/US17/47175.
Jan. 14, 2020—(CA) Examiner's Report—App. No. 3,033,961.

*Primary Examiner* — Robert T Nguyen
(74) *Attorney, Agent, or Firm* — Banner & Witcoff, Ltd.

(57) ABSTRACT

A method, medium, and apparatus for educating and reducing risk to inexperienced drivers using vehicles with autonomous navigation systems. Data regarding a driver's past experience with vehicles and operating environments may be used to proactively warn the driver about a potential danger detected or predicted by the vehicle. An autonomous vehicle may prevent the driver from operating the vehicle under unfamiliar circumstances or from causing a collision. Data regarding a driver's past experience with vehicles and the safety features thereof may be used to mitigate risk of injury or property damage by selectively activating safety features in a new vehicle which the driver has not previously driven. Data regarding a driver's past experience with vehicles and safety features thereof may be used to determine a decreased or increased rental rate for a particular vehicle.

13 Claims, 6 Drawing Sheets

(51) Int. Cl.
*B60W 40/09* (2012.01)
*B60W 50/00* (2006.01)
*G05D 1/00* (2006.01)
*G06Q 30/02* (2012.01)
*G06Q 50/30* (2012.01)
*G06Q 10/04* (2012.01)

(56) References Cited

U.S. PATENT DOCUMENTS

| | | | |
|---|---|---|---|
| 9,834,224 B2* | 12/2017 | Gordon | B60W 50/082 |
| 9,940,834 B1* | 4/2018 | Konrardy | G08G 1/096725 |
| 2011/0153191 A1* | 6/2011 | Dhanani | G01C 21/3484 |
| | | | 701/533 |
| 2011/0307188 A1 | 12/2011 | Peng et al. | |
| 2013/0069773 A1* | 3/2013 | Li | B60K 28/02 |
| | | | 340/426.1 |
| 2014/0244096 A1* | 8/2014 | An | G05D 1/0055 |
| | | | 701/25 |
| 2014/0365062 A1 | 12/2014 | Urhahne | |
| 2015/0000601 A1 | 1/2015 | Mostert | |
| 2015/0066284 A1* | 3/2015 | Yopp | B60W 30/00 |
| | | | 701/29.2 |
| 2015/0177007 A1* | 6/2015 | Su | G01C 21/34 |
| | | | 701/25 |
| 2015/0371153 A1* | 12/2015 | Lohmeier | G06Q 10/02 |
| | | | 705/5 |
| 2016/0031450 A1 | 2/2016 | Wilson | |
| 2016/0046298 A1* | 2/2016 | DeRuyck | B60W 40/09 |
| | | | 340/576 |
| 2016/0071418 A1* | 3/2016 | Oshida | G08G 1/22 |
| | | | 701/23 |
| 2016/0171521 A1 | 6/2016 | Ramirez et al. | |
| 2016/0200317 A1 | 7/2016 | Danzl et al. | |
| 2016/0246298 A1* | 8/2016 | Sato | B60Q 9/00 |
| 2017/0038773 A1* | 2/2017 | Gordon | G05D 1/0061 |
| 2017/0088142 A1* | 3/2017 | Hunt | B60W 30/08 |
| 2017/0106876 A1* | 4/2017 | Gordon | B60W 50/082 |
| 2017/0113689 A1* | 4/2017 | Gordon | B60W 30/182 |
| 2017/0138751 A1* | 5/2017 | Martyniv | G01C 21/20 |
| 2017/0015323 A1 | 9/2017 | Oguri | |
| 2017/0270797 A1* | 9/2017 | Lee | G08G 1/162 |
| 2017/0305434 A1* | 10/2017 | Ratnasingam | B60W 40/09 |
| 2017/0369073 A1* | 12/2017 | Huber | B60W 50/0098 |
| 2018/0057016 A1* | 3/2018 | Gordon | B60W 50/082 |

* cited by examiner

US 10,640,117 B2

DRIVING CUES AND COACHING

FIELD OF ART

The present disclosure relates to autonomous (i.e. self-navigating and driving) automobiles. More specifically, it relates to methods, software, and apparatuses for improving the technological functionality of a motorized vehicle by considering a driver's experience level and a vehicle's operating environment to determine whether to activate autonomous navigation in response to a danger or challenging situation detected by the automobile, and restore driver control in response to the danger or situation passing.

BACKGROUND

Every year, millions of teenagers obtain a provisional driver's license or "learner's permit" and begin to drive for the first time. Many other adults who already have driving experience with small vehicles learn to drive commercial-class vehicles such as tractor-trailers or buses, or move from another country or climate and must learn to drive under unfamiliar traffic laws or weather conditions. Some new drivers may be elderly or urban drivers who never previously needed to drive but need to learn in response to a move or other change in life circumstances.

During the learning process, the driver may be accompanied by a parent or instructor in the passenger seat, instructing the driver, providing feedback, and warning about possible dangers. Traditional vehicles specialized for driver's education may have an additional brake pedal installed for the front passenger to allow a driving instructor to brake the car to prevent a collision. However, any other intervention to transfer control from the driver to the instructor requires the driver to park the car and trade seats with the instructor.

The risks of property damage or injury as a result of mistakes by drivers who are still learning can be mitigated by the use of autonomous navigation systems. Existing autonomous navigation systems automate parallel parking for drivers who might cause a collision if attempting to park between cars. Existing autonomous navigation systems also detect an unseen car in a blind spot and may take over control to prevent a lane change that would lead to a collision. However, existing autonomous systems do not react to a wide variety of other situations or dangers to which an autonomous navigation response might be preferable to continuing control by an inexperienced driver. Such systems also fail to incorporate educational components, inter alia, that might lead to the driver improving and better understanding the nature of a dangerous situation.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for training inexperienced drivers in vehicles with autonomous navigation systems. Drivers may be trained to become accustomed to sudden takeover of autonomous navigation by the vehicle, and may also learn to drive a vehicle with less risk of injury or property damage if the autonomous vehicle has the capability to prevent the driver from operating the vehicle under unfamiliar circumstances or from causing a collision.

Data regarding a driver's past experience with vehicles and operating environments may be used to proactively warn the driver about a potential danger detected or predicted by the vehicle. If the danger is sufficiently great, or the driver sufficiently inexperienced, the vehicle may assume autonomous navigation until the danger has subsided. When the vehicle restores manual control to the driver, the vehicle may generate a debriefing message to inform the driver why autonomous navigation was activated, and if the need for autonomous navigation was avoidable, what steps would have been prudent.

Data regarding a driver's past experience with vehicles and the safety features thereof may be used to mitigate risk of injury or property damage by selectively activating safety features in a new vehicle which the driver has not previously driven. Alternatively, the driver may be advised or warned that safety and navigation features to which the driver is accustomed are not present in the vehicle, so that the driver may drive more defensively and not inadvertently cause a collision by relying on a feature not present.

Data regarding a driver's past experience with vehicles, safety features thereof, and operating environments may be used to determine a decreased or increased rental rate for a particular vehicle, whose safety features may mitigate driver risk which would otherwise exist, or whose lack of safety features may elevate driver risk for a driver that may be dependent on safety features from a previously-driven vehicle.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
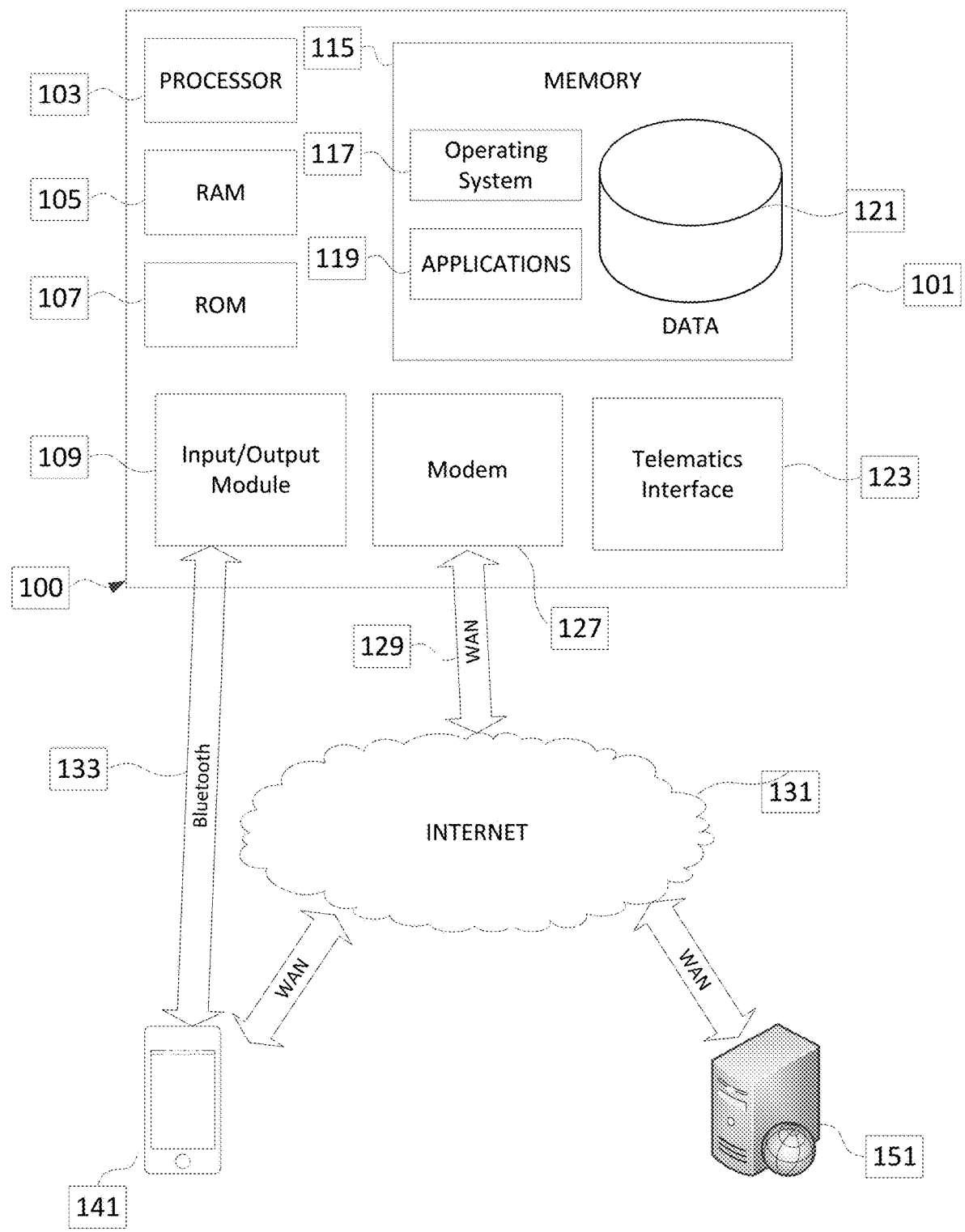
FIG. 1 illustrates a network environment and computing systems that may be used to implement aspects of the disclosure.

FIG. 1 illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices configured as described herein to identify a driver of a vehicle, retrieve driver experience parameters, and use telematics and other sensor data to determine whether to assume autonomous navigation control over a vehicle.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the computing device 101 to execute a series of computer-readable instructions to identify a driver of a vehicle, retrieve driver experience parameters, and use telematics and other sensor data to determine whether to assume autonomous navigation control over a vehicle.

The computing device 101 may operate in a networked environment 100 supporting connections to one or more remote computers, such as terminals 141 and 151. The terminals 141 and 151 may be personal computers (e.g., end-user customer computers), servers (e.g., web servers, database servers), mobile communication devices, portable computing devices and the like that include many or all of the elements described above with respect to the computing device 101. The network connections depicted in FIG. 1 include a wide area network (WAN) 129, but may also include other networks such as a Bluetooth connection 133 to a nearby computing device 141, or local area network (LAN). When used in a WAN networking environment, the computing device 101 may include a modem 127 or other means for establishing communications over the WAN 129, such as network 131 (e.g., the Internet). It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the computing device 101 may include computer executable instructions or algorithms for identifying a driver of a vehicle, retrieving driver experience parameters, and using telematics and other sensor data to determine whether to assume autonomous navigation control over a vehicle, and performing other related functions as described herein.

Figure 2:
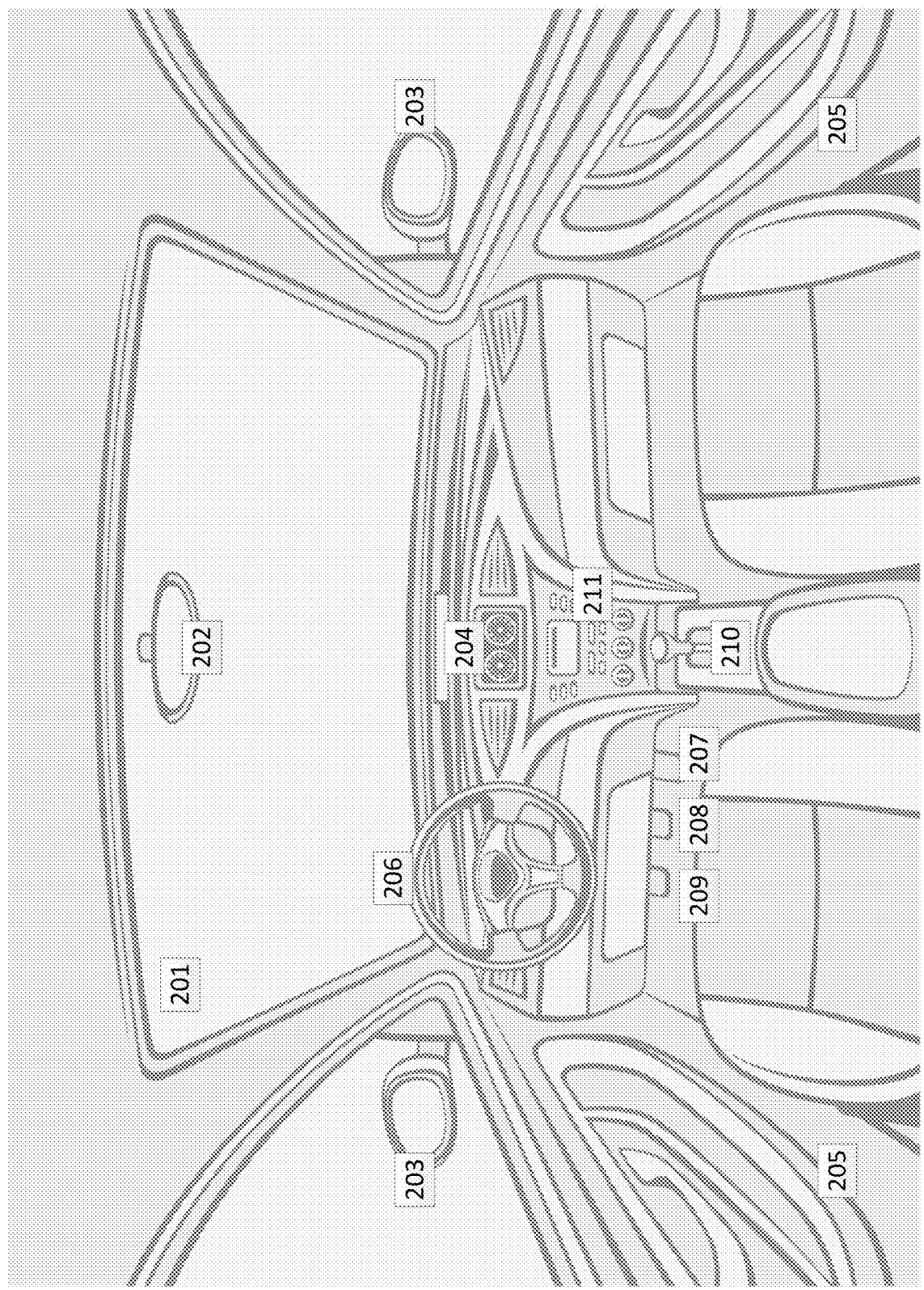
FIG. 2 is a diagram of the interior and components of an autonomous vehicle, according to one or more aspects of the disclosure.

FIG. 2 is a diagram of the interior and various components of an autonomous vehicle, according to one or more aspects of the disclosure.

The autonomous vehicle may have a plurality of input and output interfaces for a driver. The driver may take in information about the vehicle's surroundings via seeing through windshield 201, rear view mirror 202, and side view mirrors 203. The vehicle itself may be further able to communicate with the driver via display 204, which may comprise a screen capable of simulating a speedometer and odometer, displaying other information, or receiving user menu selections via a touchscreen. The vehicle may be further able to communicate with the driver via stereo audio speakers 205 built into the doors of the vehicle, or the front or rear of the vehicle.

The autonomous vehicle may be controlled by the driver, when not in an autonomous navigation mode, via the steering wheel 206, accelerator or gas pedal 207, brake pedal 208, clutch 209, gearshift 210, or interior control buttons 211 (which may control, for example, a radio, a music player, other audio settings, fans, heating, air conditioning, or other air circulation settings). Display 204 may also comprise a touchscreen to allow the driver to tap and select options. The steering wheel 206, gearshift 210, or a touchscreen of display 204 may comprise a fingerprint reader that can read a thumb print or other fingerprint to authenticate the identity of a driver.

The autonomous vehicle may comprise an internal camera that can track the head position and eye movement of the driver to determine where the driver is currently looking and where the limits of the driver's range of vision lie. The autonomous vehicle may also comprise an internal microphone to allow the vehicle to pick up speech from the driver, respond to verbal commands from the driver, determine whether loud music or other noise exists inside the vehicle, or otherwise monitor the interior.

Figure 3:
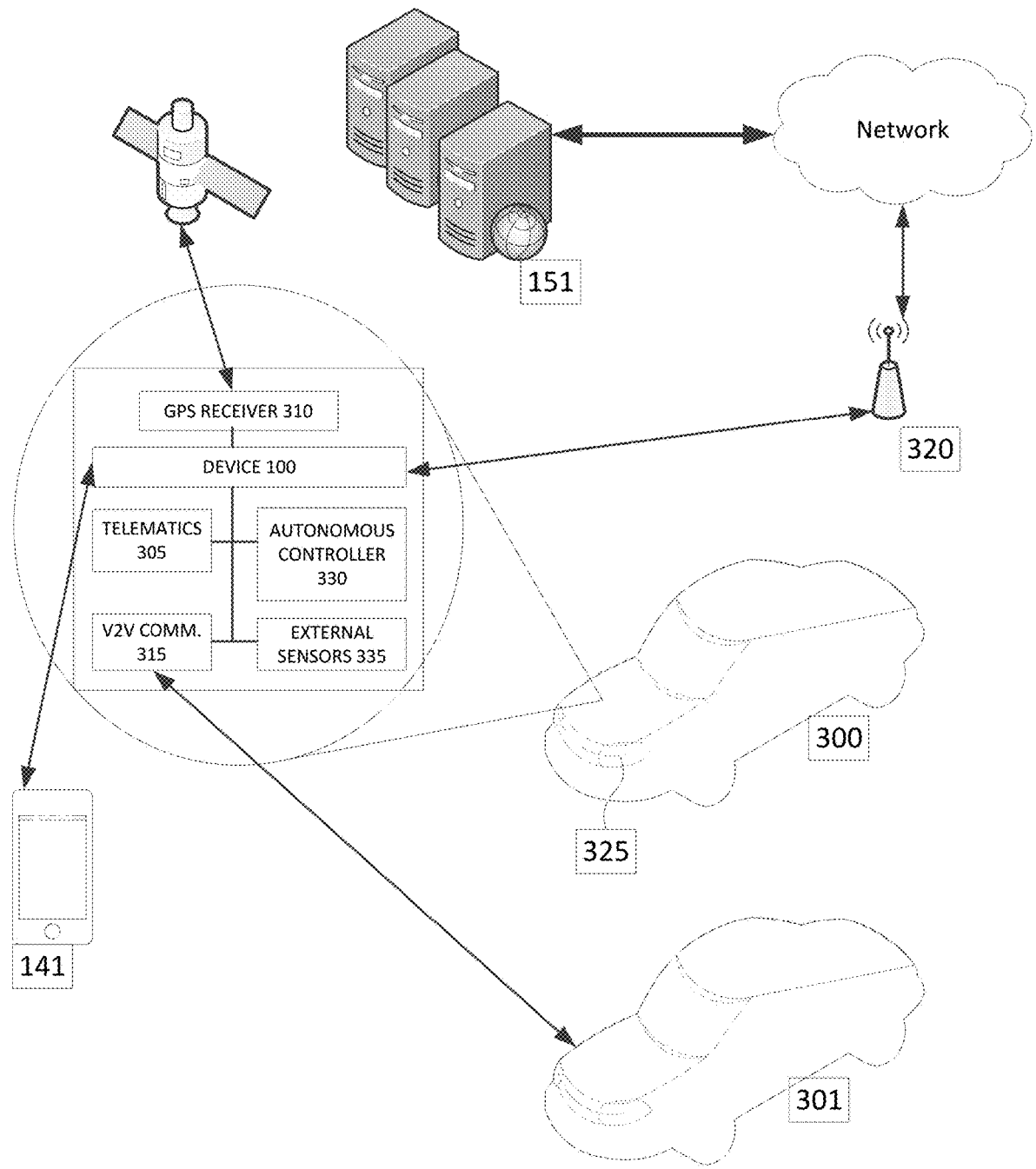
FIG. 3 is a diagram of the exterior and data input/output connections of an autonomous vehicle, according to one or more aspects of the disclosure.

FIG. 3 is a diagram of the exterior and data input/output connections of an autonomous vehicle.

The autonomous vehicle 300 may comprise external sensors 335, which may include, among other sensing apparatuses, one or more external cameras to view the vehicle's surroundings, one or more external microphones to detect the sound and direction of sirens or of the operation of other vehicles not perceived by an external camera, one or more motion detection sensors to detect obstacles entering the road, or a radar or sonar emitter and receiver to determine the distance to or relative motion of objects. The vehicle may also comprise a global positioning system (GPS) receiver 310 to determine the current location of the vehicle.

The vehicle may comprise telematics sensors 305 such as a speedometer, an odometer, or on-board diagnostic (OBD) system for tracking the functioning of the engine and other systems of the vehicle. Data gathered by these devices may include speed, acceleration, G-forces (i.e., units of acceleration in comparison to normal gravity), distance traveled, turns performed, engine revolutions per minute, mileage per gallon, or engine damage or malfunctions. Additional data may be gathered by a connection to a mobile computing device 141 possessed by the driver of the car, such as GPS data from a GPS sensor of the mobile computing device or acceleration/deceleration/lane change/turn/swerving data from a multiple-axis accelerometer of the mobile computing device.

The vehicle may also comprise a vehicle-to-vehicle (V2V) communication system 315 for sending information to and receiving information from a similar communications device in one or more other nearby vehicles 301. The V2V communication systems of two vehicles may communicate directly with one another, using a near field communications system, or may both connect to a centralized network location 302, such as a wireless router or cell tower, that may route communications between the vehicles.

The headlights 325 of the vehicle may comprise one or more lenses or mirrors that allow focusing of headlight beams much more precisely than the traditional settings of "high beams" or "low beams". For example, the headlights may be able to focus at an angle away from the front-back axis of the vehicle, so that they can particularly light up an obstacle at the side of the road, or which may enter the road, such as a pedestrian, deer, or other animal.

The vehicle may comprise an autonomous control system 330. The autonomous control system may be directly coupled via actuators to the steering wheel, brake pedal, and acceleration pedal of the vehicle, and be capable of causing them to turn or depress without a driver's touching them or application of force. Alternatively, the autonomous control system may bypass the mechanisms of the steering wheel, brake pedal, and acceleration pedal, allowing axles, the engine, or brake pads to be controlled without the steering wheel, brake pedal, and acceleration pedal being manipulated.

The autonomous control system may be coupled to and receive data from a number of components and sensors, including but not limited to on-board diagnostic system, speedometer, GPS receiver, external cameras, radar, sonar, external microphone, and V2V communications systems, in order to determine and follow a lane of a road, determine any turns or other maneuvers necessary to reach a destination, and determine the locations of other vehicles or obstacles in the road.

A device 100 embodying some aspects as presented herein may connect to mobile computing device 141 or centralized server location 151 in order to retrieve historical driving data, authentication or permission data for a particular driver, additional information about the operating environment of the vehicle which has not been picked up by internal or external sensors of the vehicle, or updates to the device's software.

The device may connect to the autonomous control system and have the ability to issue the autonomous control system a command to begin autonomous navigation or to conclude autonomous navigation. The command may comprise further information, such as a command to navigate to a particular location or a command to avoid a particular obstacle that has been identified in or near the road. The device may also be connected to and have access to data determined by the external sensors, telematics sensors, GPS receiver, and V2V communications receiver, and may be able to issue commands to a V2V transmitter to communicate information to other vehicles on the road.

Figure 4:
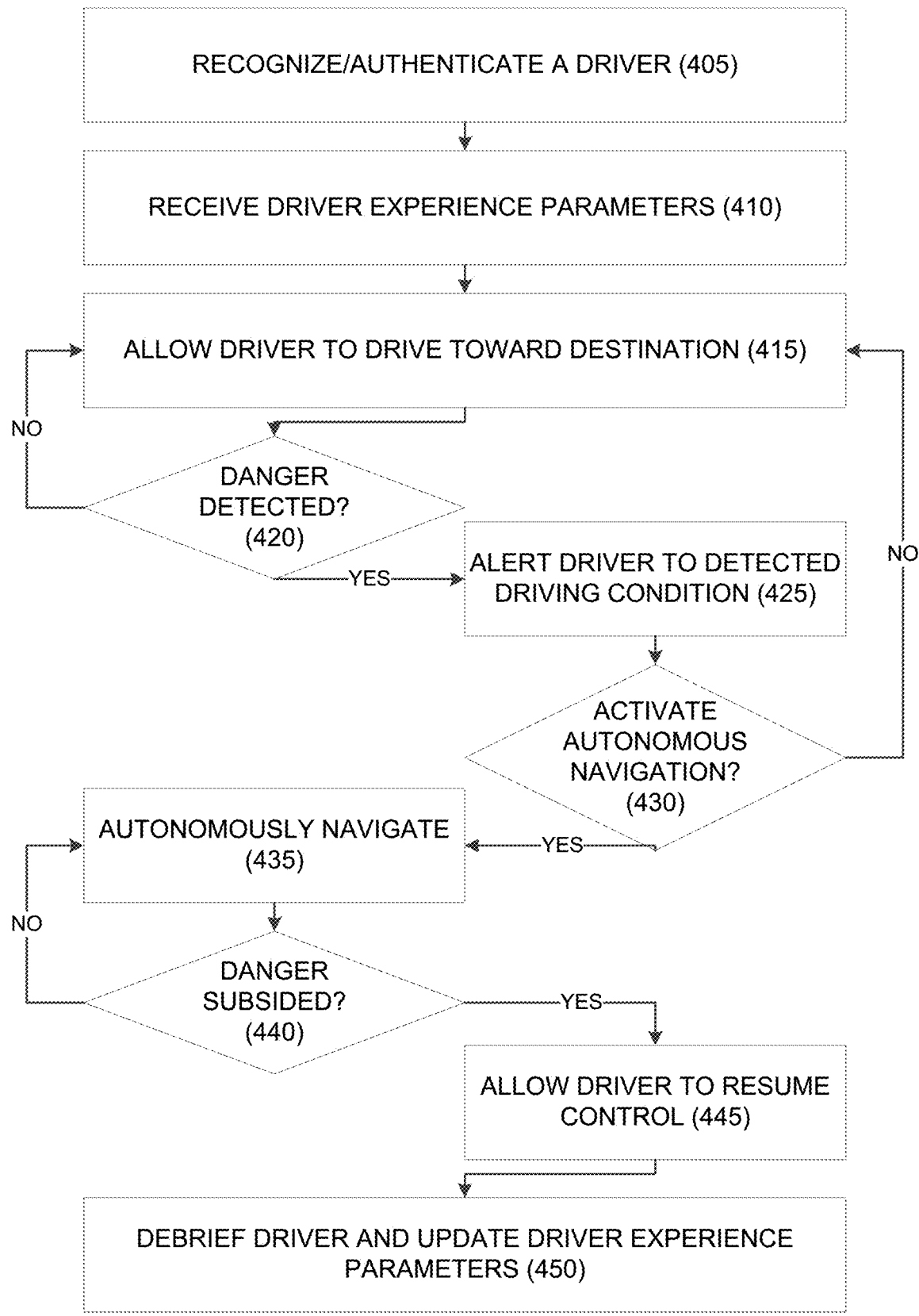
FIG. 4. is a flow diagram illustrating an example method of disabling driver control over a vehicle in response to a driving condition and restoring driver control over the vehicle in response to the driving condition ceasing, according to one or more aspects of the disclosure.

FIG. 4 is a flow diagram illustrating an example method of assuming autonomous control over a vehicle in response to detecting a situation for which the driver may be unprepared, and restoring manual control to the driver after the situation has been resolved.

In step 405, the vehicle may recognize a driver who has entered the vehicle and determine that he or she is authorized to control the vehicle. The recognition or authentication of the driver may be performed by detecting that a unique key fob having a radio transmitter and associated with a particular driver has entered the vehicle, by having a driver select a name from a predetermined set of drivers authorized to operate the vehicle, by having the driver sign in using a password associated with that driver out of the predetermined set of all drivers authorized to operate the vehicle, by having the driver use a mobile phone application that communicates with the vehicle to sign in and uniquely identify the driver, by detecting a thumbprint or other fingerprint of the driver using a fingerprint scanner in steering wheel 206, in a touchscreen of display 204, or of a mobile computing device in communication with the vehicle, by facial recognition of the driver using internal cameras of the vehicle, or by voice recognition using one or more internal microphones of the vehicle.

In step 410, the vehicle may retrieve driver experience parameters corresponding to the driver from a driver data store. The experience parameters may be locally stored in a memory module in the vehicle, may be stored in a mobile computing device possessed by the driver to which the vehicle may connect via wireless network, Bluetooth, or other direct data connection, or may be stored at a centralized server location with which the vehicle is capable of communicating via a wireless communications device of the vehicle.

The driver experience parameters may comprise total amount of time spent driving the vehicle, total amount of time spent driving each of one or more other vehicles, an enumeration of safety features or autonomous features in each of the vehicles driven by the driver, amounts of time spent driving at one or more times of day (such as dawn, daylight, dusk, or nighttime), amounts of time spent driving in one or more weather conditions (such as rain, snow, sleet, strong wind, hail, thunderstorm, fog, flash flood, extreme cold, extreme heat, or clear weather), amounts of time spent driving on one or more road types (highway driving, urban driving, suburban driving, rural driving, paved roads, gravel roads, or dirt roads), a history of driving test results (such as grades given by a driving instructor on one or more tasks, or a score given by a driving simulation in which the driver participated), and/or a history of the driver's driving events (such as acceleration events, turns, lane changes, braking/deceleration events, collisions with stationary objects, collisions with other vehicles, reactions to changes in traffic lights, issued tickets, or other legal infractions).

In step 415, the driver may begin driving the vehicle towards a destination. The driver may have input a specific destination beforehand, such as by entering an address into a GPS system of the vehicle or of a mobile computing device in order to receive directions or explicitly inform the vehicle of the intended destination. Alternatively, the vehicle may determine a likely destination based on previous schedules and behavior of the driver. For example, a drive beginning at 7:00 am on a Tuesday morning may be assumed to be a trip to a school that the driver attends and travels to daily at that time. A drive at 4:00 pm on Saturday may be assumed to be a trip to a local shopping center if the driver often visits the shopping center on Saturday afternoons. If the driver is on an interstate and has not indicated a destination, the destination may be assumed to be an off-ramp often used by the driver, or the nearest off-ramp from the interstate.

As the driver operates the vehicle, the vehicle may take in data from the environment using its various external sensors and communications devices. The vehicle may determine its location via a GPS unit built into the vehicle, else associated with the vehicle (e.g., via a user's smartphone in the vehicle, or other device in the vehicle's proximity). It may determine external weather conditions via external cameras, or by wirelessly obtaining a current weather report from a meteorological data source and cross-referencing the report with a GPS reading to determine the current weather at the vehicle's location. The vehicle may determine external light level via external cameras, and may determine either that there is too little light to see potential obstacles ahead, or too much light, if the sun, another vehicle's headlights, or another bright light source is directed towards the driver and may blind the driver. The vehicle may alternatively determine external light level by computing the light level from an internal clock and a determined latitude and longitude of the car to determine the available sunlight at that location. The vehicle may determine qualities of a road on which the vehicle is travelling (such as legal speed limit, average speed of traffic, traffic density, suggested or cautionary speed of a curve, paving or surfacing material, or number of lanes) by consulting external cameras and/or telematics sensors of the vehicle, or by determining the vehicle's current location and cross-referencing with a database of roads or traffic reports. The vehicle may determine whether any temporary dangers associated with the road are present (such as obstacles, pedestrians, animals, other traffic, other inattentive or unconscious drivers, emergency vehicles, law enforcement vehicles, railroad crossings/trains, potholes, or other road damage) using external cameras.

The vehicle may additionally sense information about the driver's mental state, and especially whether the driver is inattentive to the current state of the vehicle's surroundings. Inattention may be determined, in one example, by tracking the driver's eye movements or head orientation using a camera inside the vehicle and determining that it is impossible or unlikely that the driver would be aware of anything in a particular field of vision or direction. Inattention may be determined, in another example, by sensing that the driver is manipulating vehicle controls such as a radio tuner or volume control of the vehicle. Inattention may be determined, in yet another example, by sensing that the driver is using a mobile phone, either via a camera inside the vehicle or by a report from an app of the mobile phone itself. Inattention may be determined, in yet another example, based on music or other audio content being played by speakers of the vehicle, or a determination may be made that the audio content will make it difficult for the driver to hear a potential danger outside the vehicle, such as an emergency vehicle, law enforcement vehicle, another vehicle on the road., or a train Inattention may be determined, in yet another example, by the driver's failure to match the speed of traffic, erratic braking and acceleration, failure to respond to green traffic lights, delayed reaction to red or yellow traffic lights, or by erratic or swerving motion within a lane. The vehicle may additionally determine that the driver is asleep or losing consciousness, for example by tracking eye movement, eye closure, drifting out of lane by the driver, or any of the inattention evidence described above.

Data regarding a driver's inattention or unconsciousness may be transmitted via V2V communications to other nearby vehicles to allow them to warn their drivers or prepare to take evasive maneuvers via autonomous navigation. V2V communications may also be used to transmit information that a current driver is a novice, playing a role analogous to a "student driver" sign but allowing both human drivers and autonomous navigation systems to take into account the driver's inexperience while driving nearby. V2V communications may also transmit information that a driver has been involved in collisions of a particular type or exhibited reckless behavior in the past. Conversely, the vehicle may receive information regarding the inattention, unconsciousness, inexperience, or reckless behavior of other drivers in order to prime its own autonomous navigation system for defensive driving or to warn the driver.

The vehicle may additionally track data regarding the driver's control over the vehicle (such as acceleration, speed, turns, lane changes, centering within a lane, or braking). Data may be stored to determine whether the driver is generally improving with respect to smooth acceleration and deceleration, staying centered within a lane, maintaining appropriate speed before and during turns, and generally avoiding any reckless action.

In decision 420, which may occur many times per second, the vehicle may utilize the data received from the variety of sources described above to attempt to detect an acute or persistent condition that poses a potential challenge to a driver. If nothing about the road, vehicle, environment, driver, or other vehicles indicates that there is any danger, the drive continues without interruption.

The detected challenge or condition may include driving in a persistent situation unfamiliar to the driver, such as dawn/dusk/twilight, blinding glare, nighttime, rain, sleet, hail, snow, strong wind, high-speed roads/highways, high-traffic roads/"urban driving", gravel or dirt roads, or roads that require a specialized experience to safely traverse.

The detected challenge or condition may alternatively be a temporary acute danger, such as an approaching emergency vehicle, an approaching law-enforcement vehicle, a train at a railroad crossing, approaching heavy or stopped traffic, an animal, pedestrian, or other non-vehicular obstacle in the road, or a distracted or incapacitated driver in another nearby vehicle.

As described in the previous paragraphs, the determination that the challenge exists may be made directly by interpreting data received from external cameras or other sensors of the vehicle, or may be determined by receiving data about the road, weather, or other traffic from an information source from which the existence of the challenge may be derived.

In step 425, the vehicle may alert the driver to the danger or challenge using one or more visual or auditory cues.

The vehicle may use a variety of displays to give visual cues to inform the driver about the danger or challenge. For example, a light in one of the rear or side view mirrors 202 and 203 may be turned on or blink to indicate a direction of a vehicle in the driver's blind spot, the direction of an emergency vehicle that may otherwise be invisible or inaudible to the driver, or the direction of another obstacle or hazard. Headlights 325 of the car may be able to focus beams directly on an obstacle such as a deer, pedestrian, bicyclist, motorcyclist, or stopped vehicle in the road ahead.

The vehicle may generate a heads-up display (HUD) intended to overlay a screen and highlight elements therein or convey other information to the driver. The windshield 201 may be used as a screen to display the HUD either via a built-in display or via a display projected onto or reflected off of the inner surface of the windshield. The dashboard display 204 of the vehicle may also be used to display the HUD. The HUD may also be transmitted to and displayed by a MICROSOFT™ HoloLens™, GOOGLE™ Glass™, or other optical device used by the driver while driving.

A HUD may visually highlight a danger (such as a deer, other animal, pedestrian, bicyclist, motorcyclist, train, pothole, or other inanimate object) with a colored or flashing overlay to indicate its location to the driver in real time. The HUD may also display information related to dangers outside of the field of vision covered by the HUD, such as indicators that a vehicle is behind the driver or in the driver's blind spot. The HUD may also display other operation data of the vehicle, such as the current speed, whether the vehicle is travelling above the speed limit for the road the driver is on, remaining fuel range, distance to destination, etc.

The vehicle may use one or more auditory cues to inform the driver about the danger or challenge. For example, a chime or other auditory effect could be played to indicate that a danger has been sensed ahead, such as stopped traffic, a train approaching a railroad crossing, or an obstacle entering the road (such as a deer, other animal, pedestrian, bicyclist, motorcyclist, pothole, or other inanimate object). Audio cues may take advantage of the stereo, "surround sound", or other multiple-speaker features of the vehicle to indicate the direction from which a challenge may come. A cue may indicate the direction of another vehicle in the driver's blind spot by playing only from a left or right speaker of the vehicle. A cue may indicate the direction of an emergency vehicle or law enforcement vehicle via the balance of the sound emitted from the left, right, front, or rear speakers, and may amplify the sound of the emergency vehicle's siren via the speakers if the siren is too quiet to be heard within the vehicle. The vehicle may, at the time a cue is played, decrease the volume of or disable the vehicle's radio or music player to ensure that the cue is audible. The vehicle may, instead of a chime, use the speakers to amplify the sound of a siren, train whistle, or car or motorcycle engine that might otherwise be unheard due to the insulation of the vehicle.

Instead of a chime or other cue, the speakers may be used to play pre-recorded or synthesized speech warning the driver about the acute or persistent condition. For example, the speakers may play a message that "You are approaching stopped traffic. Please decelerate." or "You are pulling onto a highway on-ramp; automatic navigation will begin until you leave the highway."

In decision 430, the vehicle may consult the previously retrieved driver data and make a determination whether to assume control and autonomous navigation.

The determination may be based in part on the driver's experience with the detected danger or situation. If the current drive is the driver's first encounter with the situation, the vehicle may automatically assume autonomous navigation, such as by taking control as soon as falling or accumulated snow is detected. Alternatively, the vehicle may react to the driver's first encounter by assuming control only if the driver takes a predetermined reckless action, such as speeding or following another vehicle too closely while snow is falling. Alternatively, the vehicle may react to the driver's first encounter by assuming control at a predetermined interval sooner than the vehicle would intervene if a more experienced driver were driving, such as by applying brakes if traffic is stopped five seconds ahead in the snow, when with a more experienced driver, brakes would not be applied until traffic is four seconds ahead, trusting more that the driver will apply brakes himself or herself. As a driver's experience increases, the vehicle may wait longer before assuming autonomous control. For example, while the vehicle might assume control in response to the driver's first encounter with snow, a third encounter with snowfall might not trigger autonomous control until snow begins accumulating on the road. The determination may additionally be based on a total experience level of the driver (such as allowing the driver to maintain control in a given situation if the driver has more than one year of total driving experience, but not if the driver has one month of driving experience).

The determination may be based in part on a determined severity level of the danger. For example, a possible collision with an emergency vehicle, law enforcement vehicle, train, pedestrian, or large animal like a deer may be assigned a high severity. Blinding light or accumulated snow may also be assigned a high severity due to the risk of a subsequent crash or leaving the road. Driving near a determined reckless driver or in heavy rain or snowfall without accumulation may be assigned a medium severity. Driving on a highway without dense traffic, on a gravel or dirt road, or at night may be assigned a low severity.

The vehicle may take control without delay under all circumstances where the severity is high and the driver is not experienced with the danger. Alternatively, the vehicle may assume control at a predetermined interval sooner than the vehicle would intervene for a medium or low severity threat.

The determination may also be based on the imminence of the danger. For example, the autonomous navigation may take over if it is determined that a deer or pedestrian has entered the road or is at the edge of the road, but not if the deer or pedestrian is a predetermined distance from the edge of the road and likely cannot move into the vehicle's path in time to cause a collision. In another embodiment, the autonomous navigation may take over if it is determined that an inattentive driver in another vehicle is no longer centered in his lane, but not if the driver is inattentive but remains centered. In another embodiment, the autonomous navigation may take over if the vehicle is speeding while traffic is present less than three seconds ahead on the road, but not if the traffic is more than five seconds ahead.

At the time the vehicle determines that autonomous navigation will be engaged, the vehicle may warn the driver (if engagement is not necessary for a number of seconds) or immediately engage without warning if the danger is imminent. Warning may be performed via a display or HUD generated in step 425, or by a chime or message played over the vehicle's speakers. The vehicle may engage autonomous navigation and continue towards the determined or predicted destination while using one or more or all possible safety features and defensive driving to keep the driver safe from the challenge that the autonomous system has determined that the driver is unprepared for and poses unacceptable risk.

In an example embodiment, vehicle 300 may be equipped with device 100, which may make determinations whether to assume autonomous control, and external cameras which feed data to both device 100 and the autonomous control system. After having previously determined that a driver has only been driving for two weeks and has never driven a vehicle at night, the vehicle may continuously monitor light level and prepare to issue a warning that headlights should be activated. The vehicle may further use the external cameras to watch for hazards in or beside the road, and upon detecting a hazard, focus headlights upon it and issue an audio warning via the speakers that the hazard has been detected. The vehicle may determine whether the driver is appropriately reacting to the hazard, by slowing down and/or adjusting position within the lane to avoid it. If the driver does not slow down or adjust, the vehicle may warn the driver that autonomous mode will be activated, and device 100 may issue the command to autonomous control system 330. The vehicle may then take evasive action to avoid the hazard. The vehicle may further monitor the vehicle's speed and force the driver to slow down by assuming control over the accelerator if the vehicle's speed exceeds safe driving speeds at the current light level.

In another example embodiment, after having previously determined that a driver has received multiple speeding tickets or exceeded the speed limit in the past, device 100 may monitor the current road via data from GPS and/or external cameras of the vehicle. In response to the driver pulling onto a highway, the vehicle may warn the driver via audio message that the vehicle will be autonomously navigated if the driver exceeds the speed limit and the average speed of surrounding traffic. Device 100 may monitor the surrounding traffic using data from V2V communications and/or external cameras, and may monitor the vehicle's speed via a connection to the telematics sensors/on-board diagnostics, and may determine that the driver is exceeding both the speed limit and the speed of surrounding traffic. In response, device 100 may issue a command to autonomous control system 330 to navigate the vehicle to the nearest off-ramp from the highway, or to a particular off-ramp further ahead, and may not restore control of the vehicle to the driver until the vehicle is no longer on the highway.

When switching to autonomous navigation, the vehicle may assume control over steering, but not acceleration or braking, over acceleration or braking only and not steering, or total control over the vehicle, as circumstances require to avoid a potential collision or reduce risk of future collision.

In decision 440, which may be performed many times per second or at a longer interval, such as once per second, once per thirty seconds, once per minute, or once per five minutes, the vehicle may assess the previously detected situation as the vehicle drives towards the destination, and determine whether the condition is still in effect. For example, the vehicle may determine via data from an external camera or received weather data that rain, sleet, snow, hail, or other precipitation are no longer falling in the vicinity of the vehicle or are not accumulating on this portion of the road. The vehicle may determine that the level of ambient light has increased via data from external cameras or the passage of time determined since dawn. The vehicle may have navigated itself towards a previously determined destination until it is no longer in an urban driving environment, on a highway, or on a dirt or gravel road, as determined by GPS data cross-referenced with received data on road types, or via external cameras. The vehicle may determine that an emergency vehicle, train, distracted driver in another vehicle, or other potential collision risk is no longer nearby, based on data from an external camera, external microphone, or V2V data provided from the other vehicle. The vehicle may determine that the driver is attentive and no longer has divided attention or loss of consciousness, based on the eye movements or actions picked up by an internal camera of the vehicle.

Alternatively, the vehicle may determine that it has reached its destination, even if the previously detected situation has not ended. In this case, the vehicle may stop at the destination in order to return control to the driver for parking.

In step 445, the vehicle may inform the driver that it will end automatic navigation, and in response to a confirmation from the driver, do so and allow manual control. The message informing the driver may be delivered via any of the methods used to warn the driver that the autonomous navigation would be activated. The driver may provide confirmation by voice command, by pressing a button inside the vehicle, by selecting a touchscreen option inside the vehicle, or any other input method that may be available. The driver may then continue to control the vehicle unless or until another condition is detected in response to which the autonomous navigation is re-engaged, or the destination is reached.

In step 450, the vehicle may debrief the driver after the drive is complete. The debriefing may include advice for handling driving conditions that were encountered during the drive in the future and advice for actions which the driver could take in the future to avoid the vehicle being forced to assume autonomous control. For example, the driver may be advised to slow down when snow begins accumulating in the road, to allow a greater following distance from vehicles ahead, to activate or deactivate high beam headlights to ensure obstacles are visible without blinding other drivers, or to accelerate and brake more smoothly during stop-and-go high-density traffic. The debriefing may include data regarding improvement of the driver on one or more objective criteria such as time spent centered in the lane, smoothness of acceleration and braking, distance maintained from vehicles ahead, or other factors of good driving practice and etiquette.

The debriefing may further include information comparing the driver to other drivers similarly situated, comparing the driver to those of similar age or experience, and highlighting where the driver's strengths and weaknesses lie. For example, a driver may be told that his response time to a yellow traffic light is at a certain percentile for his demographic cohort, that he drives a certain number of miles per hour faster in rainy conditions than the average member of his demographic cohort, that his total time spent driving is greater than average for his demographic cohort, or that he maintains better eye contact with the road than a certain fraction of his demographic cohort.

As a result, the driver may gain experience with low personal or property risk, improve skills, and be better able to handle challenges in the future without interference from autonomous navigation or in other vehicles which lack autonomous navigation features. The debriefing process may further be accompanied by updating the driver experience parameters with the actions taken and time spent driving by the driver during the trip, as well as the conditions under which the driving occurred.

Figure 5:
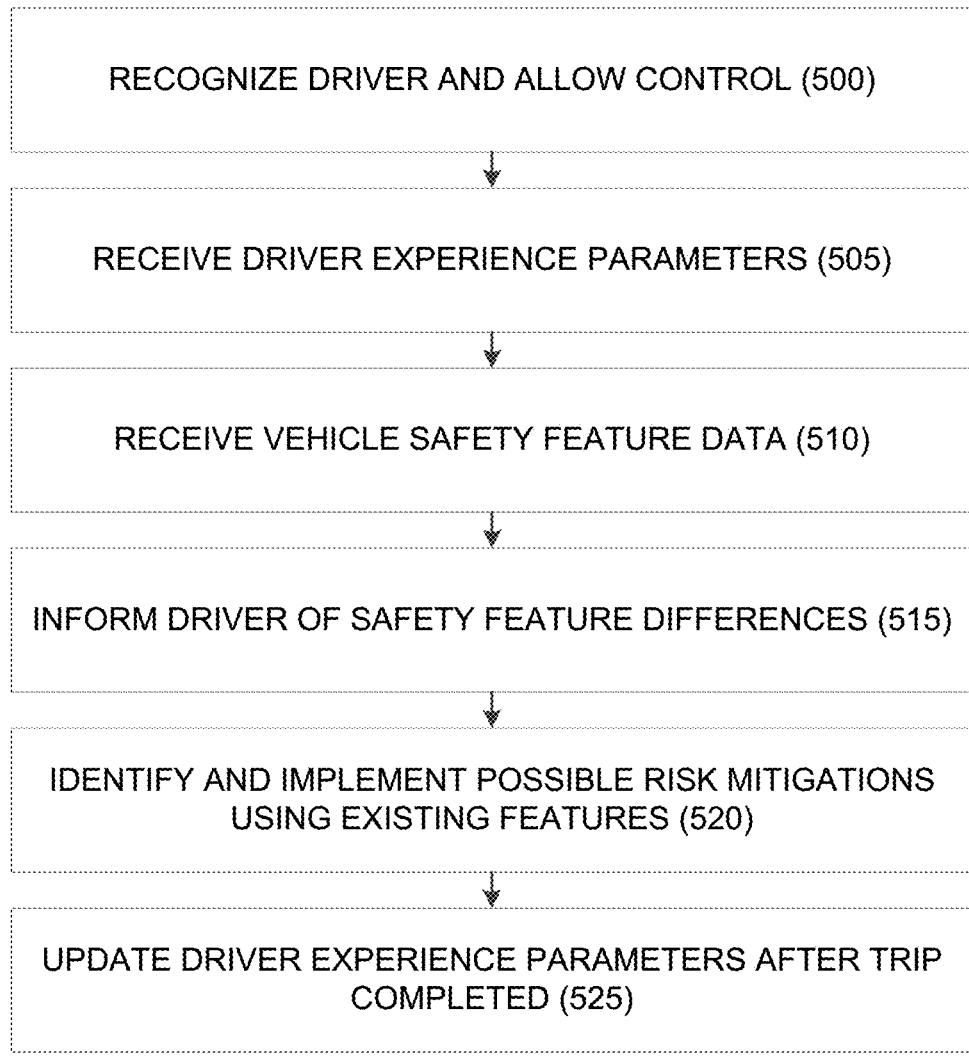
FIG. 5 is a flow diagram illustrating an example method of responding to a driver's unfamiliarity with a given vehicle, and using the given vehicle's features to mitigate differences between the given vehicle and one the driver is familiar with, according to one or more aspects of the disclosure.

FIG. 5 is a flow diagram illustrating an example method of responding to a driver's unfamiliarity with a given vehicle, and using the given vehicle's features to mitigate differences between the given vehicle and one the driver is familiar with.

In step 500, a driver may be identified by and begin driving a vehicle different from one the driver has previously had experience. The current vehicle may have a number of autonomous features, including but not limited to automatic braking in response to stopped or slowed traffic ahead, automatic prevention of lane change when another vehicle is in a blind spot, automatic takeover of navigation in response to changing weather conditions or unexpected driving situations, automatic highlighting or cueing of obstacles, dangers, or emergency vehicles, or automatic takeover of navigation in response to loss of consciousness or loss of attention.

In step 505, the vehicle may obtain driver experience parameters from a driver data store, particularly the experience levels of the driver with the current vehicle and with other vehicles previously driven by the driver. The driver's history may also be retrieved, including previous collisions, traffic infractions, or situations in which an autonomous safety system was activated in order to protect against a collision or infraction.

In step 510, the vehicle may obtain data from a database of car safety features, determining the set of features with which the driver would have experience based on the driver's history, and how much experience the driver has with each. The driver experience parameters may be consulted to determine whether each of the vehicle safety features has in fact been activated for the driver in the past, or were present but never activated. If a given safety feature has never been experienced or used by the driver, it may be disregarded despite being present in a vehicle with which the driver has extensive experience.

In step 515, the vehicle may inform the driver how the current vehicle's safety or autonomous features differ from previous vehicles operated by the driver. The message may be conveyed by a display in the vehicle, by synthesized speech audio played over the vehicle's speakers, projected onto the windshield, or via another interface available to the driver. For example, the vehicle may inform the driver that the current vehicle lacks autonomous navigation takeover in response to an attempt to change lanes while a vehicle is in the driver's blind spot, or lacks autonomous navigation takeover in response to heavy snowfall. The information may include a reference to the driver's history, such as an audio message that says "You have attempted to change lanes in the past when another vehicle was in your blind spot; this vehicle cannot stop you from changing lanes even if there is danger."

Alternatively, the vehicle may inform the driver that additional safety features that the driver has not previously experienced are present and may be activated without warning or with minimal warning, in order to minimize the driver's alarm if features such as autonomous navigation takeover are engaged.

In step 520, the vehicle may determine that one or more features of the vehicle may be used to mitigate risk created by driver reliance on a safety feature not present. For example, a lack of autonomous navigation takeover in response to an attempt to change lanes while a vehicle is in the driver's blind spot may be mitigated by a windshield-displayed HUD that indicates the presence of a vehicle in the blind spot. A lack of autonomous navigation takeover in response to heavy snowfall may be mitigated by a display HUD with a weather report or by adjustment to the anti-lock braking system and other braking settings to make them more forgiving to an inexperienced driver in snow. A lack automatic braking in response to stopped or slowed traffic ahead may be mitigated by a display HUD that displays the distance to or number of seconds until collision with a vehicle ahead if brakes are not activated, or an audio cue which signifies approaching traffic too rapidly with beeps that increase in pitch or rate as a collision becomes imminent.

In step 525, after a drive with mitigating actions has been completed, the driver experience parameters may be updated to include the additional experience with the current vehicle and its different sets of safety features and settings. Future trips taken in the same vehicle may then cause fewer warnings or advisories to be displayed, as the driver is determined to become more and more accustomed to the vehicle.

Figure 6:
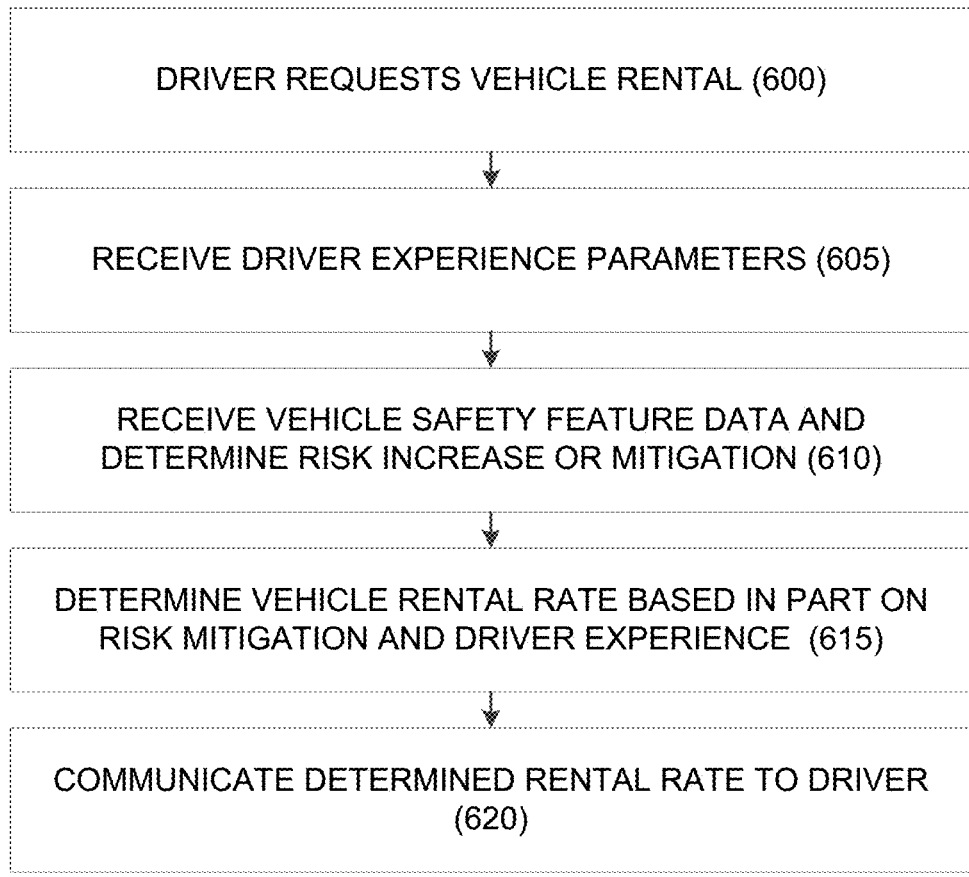
FIG. 6 is a flow diagram illustrating an example method of setting a rental rate for a vehicle based on the driver's experience with that vehicle, the driver's experience with one or more other vehicles, and the differences in autono-

FIG. 6 is a flow diagram illustrating an example method of setting a rental rate for a vehicle In step 600, a driver may request rental of a vehicle to drive for a period of time such as one day, two or more days, or a long-term lease. The request may be made via an oral request at a rental establishment, via telephone, via a website interface, or via a mobile phone application. The driver may provide personally identifying information that allows an automated process running on a computer at the rental establishment or a customer service telephone center, or on a server facilitating the website or mobile phone application, to retrieve driver experience parameters associated with the driver from a data store.

In step 605, the driver's experience parameters may be retrieved from a data store. In particular, parameters related to time spent driving one or more previous autonomous or non-autonomous vehicles may be retrieved. Any experience driving the same model of vehicle in the past may also be retrieved. Parameters may also be retrieved relating to previous driving behavior, including previous collisions, traffic infractions, or reckless behavior such as running red lights, accelerating through yellow lights, abrupt lane changes, or excessive braking and acceleration. Parameters may also be retrieved relating to previous driving experience in weather or road conditions foreseeable at the time and place of the rental. For example, if the driver requests a vehicle in the Midwest during winter, experience driving in the snow may be retrieved. If renting a vehicle overnight in downtown New York City, experience with urban and night driving may be retrieved. Local weather predictions may be consulted to see if weather-related driver experience parameters are likely to be relevant during the period of the rental.

In step 610, autonomous navigation or safety features of the requested rental vehicle may be obtained and considered in deciding whether the driver represents an increased or mitigated risk of damage to the vehicle.

Risk may be increased if, for example, the vehicle lacks safety or navigation features which the driver is accustomed to from previous driving experience in other vehicles. The vehicle may lack automatic braking in response to stopped or slowed traffic ahead, automatic prevention of lane change when another vehicle is in a blind spot, automatic takeover of navigation in response to changing weather conditions or unexpected driving situations, automatic highlighting or cueing of obstacles or emergency vehicles, or automatic takeover in response to loss of consciousness or loss of attention. Risk may also be increased if the driver is known to lack experience in the local driving conditions such as urban roads, highways, snow, rain, sleet, hail, twilight, or darkness. Risk may be increased in response to previous collisions, traffic infractions, or reckless behavior such as running red lights, accelerating through yellow lights, abrupt lane changes, or excessive braking and acceleration.

Risk may be decreased or mitigated if, for example, the vehicle has additional safety features beyond those with which the driver has experience. The vehicle may be able to assume control over navigation in response to sensed dangers in order to avoid a collision or handle a persistent condition with which the driver is unfamiliar. Previous reckless behavior or infractions by the driver may be mitigated if the vehicle's autonomous features make the reckless behavior or infraction impossible to perform in the vehicle. Risk may be decreased if the driver is accustomed to vehicles with similar safety and autonomous features to those of the requested vehicle.

In step 615, a rental rate for the vehicle may be determined based on, among other factors, the value of the vehicle, the length of the rental, one or more demographic characteristics of the driver including age, the retrieved driver experience parameters, and the risk increase or decrease presented by the requested vehicle's features with respect to the driver.

For example, a base rental rate may be determined based on the driver's age, number of years of driving experience, history of traffic infractions, value of the car, and prevalence of vehicle damage in rentals from a particular location.

The base rental rate may then be increased in response to a determination that there is a risk increase from a driver who lacks experience driving in particular environments near the rental location. The base rental rate may be increased in response to a determination that the driver is accustomed to or has relied upon autonomous safety features in the past (such as automatic braking in response to stopped or slowed traffic ahead, automatic prevention of lane change when another vehicle is in a blind spot, automatic takeover of navigation in response to changing weather conditions or unexpected driving situations, automatic highlighting or cueing of obstacles, dangers, or emergency vehicles, or automatic takeover of navigation in response to loss of consciousness or loss of attention), but that those features are not present in the requested vehicle. The base rental rate may be increase in response to a determination that historical driving data stored in the driver experience parameters, even if not recording a traffic infraction, indicates recklessness that may be predictive of a future collision.

The base rental rate may be decreased in response to a determination that the requested vehicle has several or all safety features to which the driver is accustomed, or in response to a determination that the vehicle contains additional or more advanced versions of safety features than those to which a driver is accustomed. The base rental rate may be decreased in response to a determination that the driver has a great deal of experience in the area or climate of the rental location, such as a broad experience of driving in the snow when renting in a snowy area in winter, or a broad experience of urban driving when renting a vehicle in the downtown area of a city.

The increased or decreased risk may be expressed as a number, such as a decimal value between 0.50 and 10.00, and multiplied by a base rental rate determined without consulting the driver experience parameters in order to determine a final rental rate.

In step 620, the final rental rate may be communicated to the driver. The communication may be oral, written, transmitted to a personal computer of the driver, or transmitted to a mobile computing device or mobile app used by the driver. The communication may be accompanied by an explanation of the factors determined in step 610 that affect the rental rate for the driver particularly, and may include information regarding how the factors would change if renting a vehicle having different autonomous and safety features than those of the requested vehicle.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A method, comprising:
    determining, by an autonomous vehicle, the identity of a driver of the autonomous vehicle;
    receiving, by the autonomous vehicle and from a data store, a plurality of driver experience parameters associated with the driver;
    detecting, by one or more sensors of the autonomous vehicle, a driving condition presenting a risk of personal or property damage, wherein the one or more sensors of the autonomous vehicle comprise a vehicle-to-vehicle communications receiver configured to receive a location determined by another vehicle of a particular obstacle identified in a vicinity of the autonomous vehicle, wherein the driving condition comprises an increased risk represented by behavior or experience of another driver; and
    based at least in part on the plurality of driver experience parameters and the driving condition, engaging autonomous navigation of the autonomous vehicle and ending control by the driver over the autonomous vehicle.

2. The method of claim 1, further comprising:
    detecting that the driving condition has ended; and
    in response to the detecting that the driving condition has ended, deactivating the autonomous navigation and returning control over the autonomous vehicle to the driver.

3. The method of claim 1, further comprising:
    updating one or more of the plurality of driver experience parameters; and
    transmitting the one or more of the plurality of driver experience parameters to the data store.

4. The method of claim 1, further comprising informing the driver of a reason for engaging autonomous navigation of the autonomous vehicle after a determination is made to engage autonomous navigation.

5. A non-transitory medium comprising instructions that, when performed by a processor of an autonomous vehicle, cause the autonomous vehicle to:
    determine the identity of a driver of the autonomous vehicle;
    receive, from a data store, a plurality of driver experience parameters associated with the driver;
    detect, using sensor data received from one or more sensors of the autonomous vehicle, a driving condition presenting a risk of personal or property damage, wherein the one or more sensors comprise a vehicle-to-vehicle communications receiver configured to receive a location determined by another vehicle of a particular obstacle identified in a vicinity of the autonomous vehicle, wherein the driving condition comprises an increased risk represented by behavior or experience of another driver; and
    based at least in part on the plurality of driver experience parameters and the driving condition, engage autonomous navigation of the autonomous vehicle and end control by the driver over the autonomous vehicle.

6. The non-transitory medium of claim 5, wherein the instructions, when performed, further cause the autonomous vehicle to:
    detect that the driving condition has ended; and
    in response to the detecting that the driving condition has ended, deactivate the autonomous navigation and return control over the autonomous vehicle to the driver.

7. The non-transitory medium of claim 5, wherein the instructions, when performed, further cause the autonomous vehicle to:
    update one or more of the plurality of driver experience parameters; and
    transmit the one or more of the plurality of driver experience parameters to the data store.

8. The non-transitory medium of claim 5, wherein the instructions, when performed, further cause the autonomous vehicle to inform the driver of a reason for engaging autonomous navigation of the autonomous vehicle after a determination is made to engage autonomous navigation.

9. An autonomous vehicle, comprising:
    a steering wheel;
    a brake pedal;
    an acceleration pedal;
    a computer memory storing driver experience parameters;
    a processor programmed to navigate the autonomous vehicle by controlling a speed and direction of the autonomous vehicle; and
    a non-transitory medium storing instructions that, when performed by the processor, cause the autonomous vehicle to perform steps comprising:
        determining, by the autonomous vehicle, an identity of a driver of the autonomous vehicle;
        receiving, by the autonomous vehicle and from the computer memory, a plurality of driver experience parameters associated with the driver;
        detecting, by one or more sensors of the autonomous vehicle, a driving condition presenting a risk of personal or property damage, wherein the one or more sensors of the autonomous vehicle comprise a vehicle-to-vehicle communications receiver configured to receive a location determined by another vehicle of a particular obstacle identified in a vicinity of the autonomous vehicle, wherein the driving condition comprises an increased risk represented by behavior or experience of another driver; and
        switching from a manual driving mode, in which the autonomous vehicle is controlled by the steering wheel, the brake pedal, and the acceleration pedal, to an autonomous driving mode based at least in part on the plurality of driver experience parameters and the driving condition.

10. The autonomous vehicle of claim 9, wherein the non-transitory medium stores further instructions that, when performed by the processor, cause the autonomous vehicle to further perform steps comprising:
    detecting, by the one or more sensors of the autonomous vehicle, that the driving condition has ended; and
    in response to the detecting that the driving condition has ended, switching from the autonomous driving mode to the manual driving mode.

11. The autonomous vehicle of claim 9, wherein the non-transitory medium stores further instructions that, when performed by the processor, cause the autonomous vehicle to further perform steps comprising:
    detecting, by the one or more sensors of the autonomous vehicle, that the autonomous vehicle has arrived at a predetermined destination; and
    in response to the detecting that the autonomous vehicle has arrived at the predetermined destination, switching from the autonomous driving mode to the manual driving mode.

12. The autonomous vehicle of claim 9, wherein the one or more sensors of the autonomous vehicle comprise an external camera.

13. The autonomous vehicle of claim 9, wherein the one or more sensors of the autonomous vehicle comprise an internal camera.

* * * * *